(No Model.)
C. A. CONGER.
EYE FOR ROPE HALTERS AND HITCHING ROPES.
No. 600,110. Patented Mar. 1, 1898.
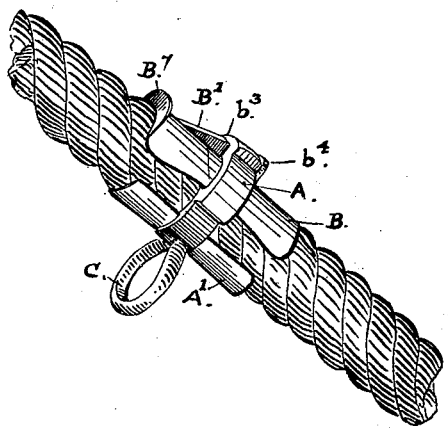
Fig. 1.
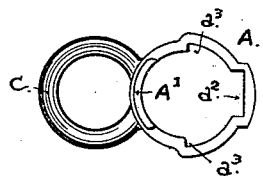
Fig. 4.
Fig. 3.
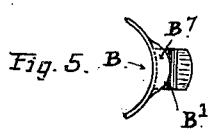
Fig. 5.
Fig. 2.
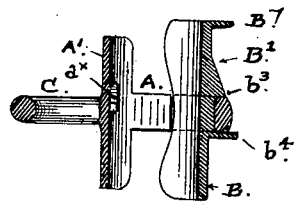
Fig. 7.
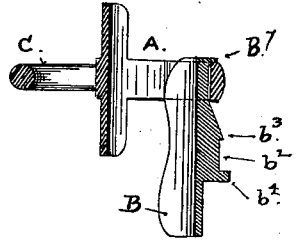
Fig. 6.
Witnesses:
Inventor:
Charles A. Conger
By Smith & Osborn
his Attys.
THE NORRIS PETERS CO., PHOTO-LITHO., WASHINGTON, D. C.

UNITED STATES PATENT OFFICE.

CHARLES A. CONGER, OF OAKLAND, CALIFORNIA, ASSIGNOR, BY MESNE ASSIGNMENTS, TO THE CONGER MANUFACTURING COMPANY, OF SAME PLACE.

EYE FOR ROPE HALTERS AND HITCHING-ROPES.

SPECIFICATION forming part of Letters Patent No. 600,110, dated March 1, 1898.

Application filed April 6, 1897. Serial No. 630,993. (No model.)

*To all whom it may concern:*

Be it known that I, CHARLES A. CONGER, a citizen of the United States, residing in Oakland, county of Alameda, and State of California, have invented certain new and useful Improvements in Eyes for Rope Halters and Hitching-Ropes, of which the following is a specification.

This invention relates to a novel means or device for securing an eye on a rope—such, for example, as an eye or loop on a rope halter or a hitching-rope.

It has for its object to fasten such eye or loop on the rope without the use of screws, pins, rivets, and similar fastenings that pass through or cut into the rope and to allow the eye or loop to be readily loosened and shifted from one place or position to another and then as readily fastened and secured in place again.

To such end and object my said invention consists in certain novel parts and combination of parts, as hereinafter described, and set forth in the claims at the end of this specification, the whole forming a simple and effective fastening device.

The following description explains at length the construction of the said parts and the manner in which the same are arranged and combined for operation, reference being had to the drawings that accompany and form part of this specification.

Figure 1 of the said drawings represents the device in position on a rope. Fig. 2 represents in side view the parts of the device in detail separated from each other. Fig. 3 is a longitudinal section through $x$ $x$, Fig. 2. Fig. 4 is a top view of the principal part or piece of the fastening, and Fig. 5 is a top view of the part B. Fig. 6 is a longitudinal section showing the position of the parts when loosened on the rope. Fig. 7 is a similar section taken through the parts after they have been forced and locked together on the rope.

A indicates a ring or collar of proper diameter internally to slip over the rope to which the fastening is to be applied.

A' is a cradle-piece or a curved plate, concave on the inner side to fit the rope and extending beyond the ring A longitudinally in both directions, so that its length exceeds the width of the collar. C is an eye or loop projecting from the back of this plate A'.

B indicates a clamping piece or plate of about the same length and width as the cradle-piece A' and of like concave shape to fit the rope. This piece B is a separate piece insertible within and removable from the collar A, and in connection with the part A' it forms a clamp to secure the collar upon the rope when it is forced into place between the rope and the collar and directly opposite to the concave piece A'. B' is a wedge-shaped block on the back of said piece B, having a notch or recess $b^2$ on the top face or back of the wedge, the length of which between the shoulders $b^3$ $b^4$ corresponds to the width of the collar A and is therefore of proper width to let in that part A. From one of the shoulders $b^3$ the block decreases regularly in height or projection downwardly to the back of the piece B, so that when the last-named piece is introduced under the collar A and is pressed longitudinally forward the wedge is crowded against the inner side of the collar and is moved along until the collar slips from the highest point of the inclined face of the wedge and drops into the seat $b^2$, provided to receive it. The lateral movement of the piece B thus produced by the wedge is sufficient to clamp the rope between the two parts A' B and hold the same from slipping.

That portion of the collar against which the wedge-block acts is cut away or shaped to form a rectangular seat or recess $a^2$, corresponding in width to the width of the wedge-block, and the inner face of the collar on both sides of said recess $a^2$ is cut away to receive the clamp B and form shoulders $a^3$ at the sides for the purpose of letting in the said piece sufficiently to bring its inner curved face flush with the inner face of the collar.

The shoulder $b^4$ extends somewhat above the highest point of the wedge, as shown in Figs. 5, 6, and 7, so that it forms a stop to prevent the piece B from being forced entirely through the collar, and a lip $B^7$ is formed on the opposite end of the same piece to prevent it from slipping out from under the collar when it is loosened on the rope. As thus constructed the said parts are placed on the rope by first slipping the rope through the collar and moving the piece along into the required position, then introducing the end of the clamping-piece B between the rope and the collar at the recessed part $b^4$, in the position illustrated in Fig. 3, and finally pressing said clamping-piece forward under the collar until the wedge passes out from under the collar and that part slips into the seat provided for it at the end of the block B'. During this operation the rope is compressed between the two concave plates A' B with sufficient force to produce a firm grip and hold upon the rope confined between them, while the outward spring or pressure of the rope against the clamp B is sufficient to retain it in place against any longitudinal strain or pulling force which the eye or ring A is called upon to bear.

An inclined rib or projecting thread $a^*$ on the inner face of the plate A', Fig. 3, having proper pitch to fit between the strands of the rope will increase the resistance of the piece against longitudinal movement or slip on the rope.

Having thus fully described my invention, what I claim as new therein, and desire to secure by Letters Patent, is—

1. The combination, with an eye or loop for a rope halter or hitching-rope, of the ring or collar having a cradle-piece to fit the rope, the clamping-piece adapted for insertion between the said ring or collar and the rope, and having a wedge-shaped block on its back provided with a recess adjacent to the higher end of the wedge and adapted to receive and confine the said ring or collar.

2. The combination, with the piece composed of the ring or collar adapted to slip over a rope, a curved cradle-piece to fit the rope and an eye or loop on said part, of a clamping-piece adapted for insertion between the said ring or collar and the rope and having a wedge-shaped block on the back and a recess in the top of said block at the higher end thereof and a shoulder or projection at the outer end of said block standing beyond the top face thereof.

3. The combination, with the ring or collar A having the cradle-piece A' at one side of the collar, and the recess $a^2$ in the inner surface of the collar opposite the cradle-piece; of the curved clamping-piece B having the wedge-shaped block $B^2$ on the back face and a recess in the top of said block to receive the ring or collar.

In testimony that I claim the foregoing I have hereunto set my hand and seal.

CHARLES A. CONGER. [L. S.]

Witnesses:
BEN. F. WOOLNER,
EDNA COMSTOCK.